United States Patent

Bolander et al.

[11] Patent Number: 5,440,116
[45] Date of Patent: Aug. 8, 1995

[54] LASER WARNING DEVICE PROVIDING A DIRECTION OF LASER RADIATION

[75] Inventors: Göran Bolander, Linköping; Kurt Nissborg, Skänninge, both of Sweden

[73] Assignee: Försvarets Forskningsanstalt, Sundbyberg, Sweden

[21] Appl. No.: 107,697
[22] PCT Filed: Feb. 14, 1992
[86] PCT No.: PCT/SE92/00091
§ 371 Date: Dec. 6, 1993
§ 102(e) Date: Dec. 6, 1993
[87] PCT Pub. No.: WO92/15024
PCT Pub. Date: Sep. 3, 1992

[30] Foreign Application Priority Data
Feb. 14, 1991 [SE] Sweden .................. 9100455

[51] Int. Cl.⁶ .................................. G01S 3/782
[52] U.S. Cl. ........................ 250/216; 250/206.2; 356/141.2
[58] Field of Search ......... 250/203.1, 203.3, 203.6, 250/206.1, 206.2, 216, 237 R, 338.1, 342; 356/141.3, 141.5, 141.2, 152.1

[56] References Cited

U.S. PATENT DOCUMENTS

| | | | |
|---|---|---|---|
| 4,325,633 | 4/1982 | Gardner | 356/141.2 |
| 4,467,194 | 8/1984 | Foreman | 250/216 |
| 4,554,447 | 11/1985 | Howard et al. | 250/216 |
| 4,868,378 | 9/1989 | Biverot | 250/206.1 |
| 5,103,088 | 4/1992 | Halldorsson et al. | 250/227.12 |
| 5,258,609 | 11/1993 | Holmes | 250/216 |

FOREIGN PATENT DOCUMENTS 2714178 10/1978 Germany .
1482753 8/1977 United Kingdom .

OTHER PUBLICATIONS

Patent Abstracts of Japan, vol. 10, No. 64, P436, abstract of JP 60-205381, Oct. 16, 1985.

*Primary Examiner*—David C. Nelms
*Assistant Examiner*—John R. Lee
*Attorney, Agent, or Firm*—Jacobson, Price, Holman & Stern

[57] ABSTRACT

A laser warning device for registering laser radiation from e.g. laser range finders or laser designators and providing a warning signal to make clear to the illuminated person that laser illumination has occurred or continues and establish the direction of incidence. A position sensitive detector or a position sensitive detector arrangement includes a detector surface that is protected from radiation that falls directly onto it, and a reflector. The reflector is designed to reflect towards the detector surface, while focusing towards the line of intersection between the detector surface and a plane that is perpendicular to the surface and in which the direction of incidence for the incoming radiation lies, the radiation that falls on the laser warning device and is parallel to the plane of the detector surface. The latter is defined as diverging not more than ±30° from the plane. Further, the radiation may come from an arbitrary angle within the detector plane, up to 360°. This leads to the arbitrary angle being determined by the position for the concentrated radiation energy.

7 Claims, 1 Drawing Sheet

LASER WARNING DEVICE PROVIDING A DIRECTION OF LASER RADIATION

BACKGROUND OF THE INVENTION

The present invention relates to a laser warning device. In a military connection, such devices have the task to register laser radiation from e.g. laser rangefinders or laser designators and by a warning signal make clear to the illuminated person that laser illumination has occurred or continues. The laser warning device can be located on or in close vicinity of military objects that are especially exposed to systems using a laser for target acquisition and the like, for instance tanks, ships and permanent installations, such as airfields etc. Laser beams for the mentioned reasons have very little divergence. Typically the cross-section of the main beam is 1 m after 1 km. It could therefore be necessary to place several laser warning devices in different places around an object in order to get a reasonable security of detection, if the object is large. Due to the atmospheric conditions there is also a weeker more or less scattered radiation of considerably greater cross-section.

The laser warning device shall indicate that laser illumination has occurred and it is also desirable that it is able to establish the direction (bearing and elevation) and the type of laser (laser wavelength, pulse length and pulse repetition frequency).

There are several previous types of laser warning devices. Most of them require a great number of light collection elements or detectors in order to determine the direction to the light source with high resolution. That what is shown in the German Offenlegungsschrift 3 300 849, U.S. Pat. No. 4,868,378 and the Swedish Patent 459 529 can be mentioned as examples. They all have different drawbacks.

SUMMARY OF THE INVENTION

The present invention, and however, solves the raised problem to determine the direction to a laser radiation source, without having the drawbacks of the previous laser warning devices, by being designed in the way that is evident from the following independent claims.

BRIEF DESCRIPTION OF THE DRAWINGS

In the following the invention will be described in more detail in relation to the accompanying drawings where.

DETAIL DESCRIPTION OF THE PREFERRED EMBODIMENTS

The laser warning device comprises a position sensitive photodetector or a position sensitive photodetector arrangement. Position sensitive detectors are previously known and in the Swedish published patent application 368 741 such a detector is described and direction is also given about basic knowledge about them. Instead of one such detector, a detector arrangement, a detector array or the like, which gives a signal that depends on the position of the illuminated spot, can be used. Therefore, when in the following a position sensitive detector is mentioned, both a single one and a position sensitive detector arrangement is referred to.

Figure 1:
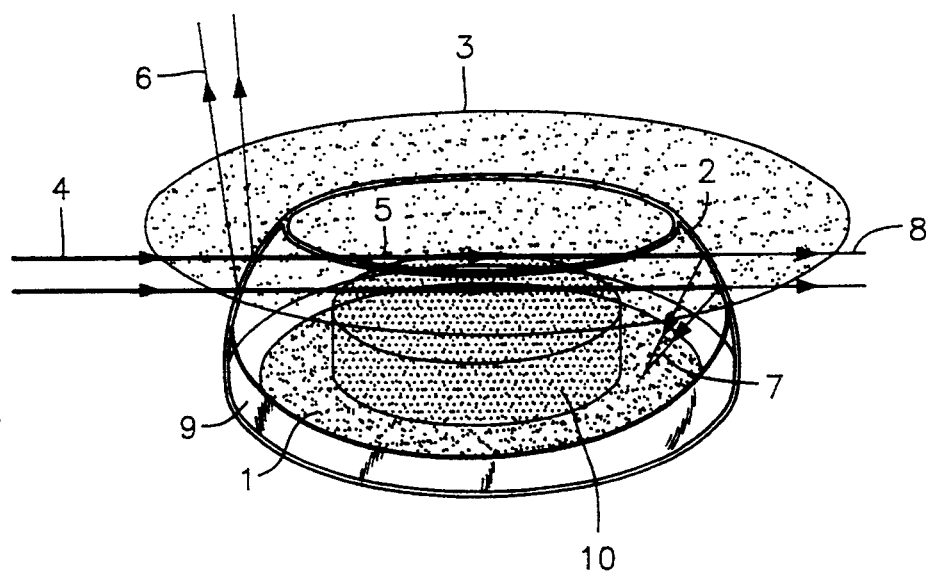
FIG. 1 shows a principal sketch of a laser warning device according to the invention.

Basis for the invention is that the laser warning device is provided with a reflector, which focus the incoming laser radiation towards the photodetector, and that the detector surface must be protected against directly incoming radiation. The focusing results in a larger signal from the detector than would otherwise have been the case. In FIG. 1 it is shown how the protection against directly incoming radiation can take the form of a roof 3 above the laser warning device. In the figure it is further shown how it is possible to implement the invention by locating the detector 1, in this case an annular position sensitive photodetector, in the focus of a surrounding reflector 2, in this case located on the inner surface of a spherical segment. The radiation that falls on the detector 2 and that is more or less parallel to the plane of the detector surface is thereby focused towards the detector as seen both in a plane parallel to the detector surface and in planes perpendicular thereto. Limits for the deviation of the radiation from a plane that is parallel to the detector surface should in practical applications not be greater than ±30°. Within said spherical segment on the other hand, the laser warning device can be sensitive to incoming radiation within a great angle, which is an advantage with the invention. Normally the laser warning device is designed to be sensitive within 90° and up to 360°.

If it is only the bearing that is of interest and not the elevation of the incoming radiation, it is possible to restrict oneself to focusing in one direction and use a reflector in the form of the inner side of a truncated cone instead of the previously mentioned spherical segment. The radiation is then focused towards a line on the detector surface, namely the line of intersection between the detector surface and a plane that is perpendicular to said surface and in which the direction of incidence of the incoming radiation lies.

If the reflector is made on the inner side of a closed dome above the detector surface, the detector gets on the same time, in a simple way, the necessary protection against the environmental influence of the surrounding world, that is rain etc.

The dome can be provided with a coating that partially reflects the wavelength of the radiation in question, so that one part 5 of the radiation 4 that falls on the laser warning device, passes through the dome 2, while another part 6 is reflected away. The part 5 that passes the dome, then passes across the warning device and hits the inner side of the opposite side of the dome 2. Then once again one part 7 of the beam is reflected in a focused way onto the detector 1, while another part 8 passes through the dome.

From the figure it is evident that the laser radiation is focused towards an area on the detector that is diametrically opposite the one from which it comes, which consequently can be used to determine the bearing to the laser source.

Figure 2:
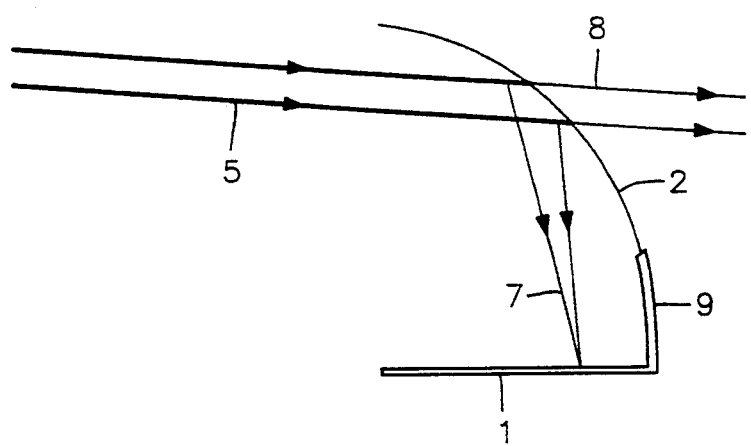
FIG. 2 shows a cross-section of said laser warning device when the laser radiation source is located above the plane of the detector surface and FIG. 3 shows the same cross-section when the laser radiation source is located below said plane.
Figure 3:
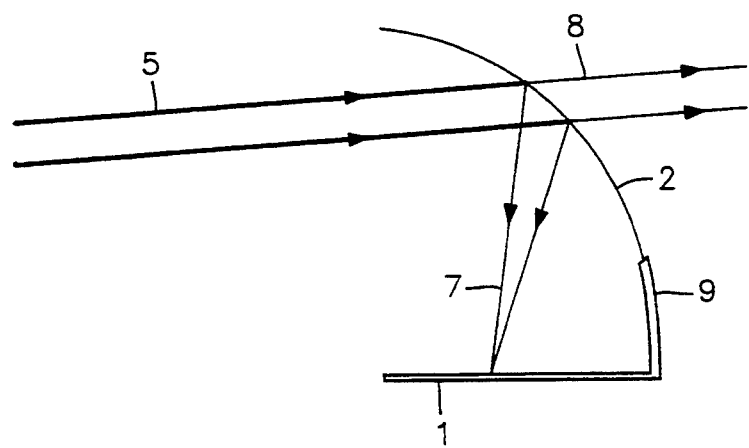

In FIG. 2 and 3 the beam path for the laser radiation from two different directions of elevation has been drawn in principle. In FIG. 2 the laser radiation source is located above the plane of the detector surface, which result in the radiation being focused further away from the centre than is the case, when the laser radiation source is located below the plane of the detector surface, which is shown in FIG. 3.

Thus it is possible to determine the bearing and the elevation of the laser source by using a photosensitive detector, which is able to register the position of the radiation that is focused in two dimensions. It is also possible to restrict the function only to the registration of for example the bearing.

The focusing of the laser radiation towards the detector will not be optimal within the entire sensitivity range of the laser warning device, due to the simple design of the collection optics. This is to a large extent compensated for by the detection being designed in such a way that the position of the central point of the collected radiation is determined.

It is also evident from the figures that parts of the laser radiation is reflected or transmitted away in the different boundary surfaces in the example shown, which reduces the sensitivity of the laser warning device. This is, however, compensated for by the device being active within a great angular range with a large light collecting area.

As an alternative to the example shown, it is possible to use a laser warning device that has a completely reflecting coating on the inner side of one or more sectors of the dome, that together take up up to half of the circumference, and opposite this sector or these sectors the dome is completely transparent. Hereby the light yield will, of course, increase considerably, as in principle all radiation in certain angles will reach the detector 1. Naturally, the drawback is that the laser warning device is only sensitive to radiation in said angles. When there is a need for coverage of a larger angle, up to the full circle, it is then possible to use two or more warning devices located close to each other, for instance stacked on each other.

In order to determine the approximate wavelength of the radiation that falls on the laser warning device, the dome can be made as a filter that blocks radiation outside a certain wavelength interval. If, then, several such laser warning devices, which are sensitive to different wavelength intervals, are located in the vicinity of each other, for instance stacked on each other, it is possible to cover a large wavelength interval at the same time as one finds out, to which wavelength interval the radiation belongs.

In order to make sure that the detector 1 is not reached by directly incoming radiation, it might be suitable to provide the dome 2 with an annular screen 9 of adapted height along its base. Further, concerning detectors 1 that have a central hole, it is possible to place a cylindrical tap 10 of adapted height near the hole as an additional screen.

We claim:

1. A laser warning device, which gives the direction of incidence towards the warning device for certain laser radiation or its perpendicular projection on a defined plane through the warning device, comprising a position sensitive detector or a position sensitive detector arrangement having a detector surface that is protected from radiation that falls directly onto it and that lies in said defined plane, including a reflector that is made on the inner surface of a rotationally symmetrical dome that surrounds the detector surface and that reflects towards said detector surface, while focusing towards the line of intersection between the detector surface and a plane that is perpendicular to said surface and lies in the direction of incidence for the incoming radiation that falls on the laser warning device and is on the whole parallel to the plane of the detector surface, defined as falling within ±30° of said plane and comes from an arbitrary angle within said plane, up to 360°, so that the position for the concentrated radiation energy determines said arbitrary angle.

2. Laser warning device according to claim 1, wherein the rotationally symmetrical dome is a spherical segment, which result in the reflector focusing the radiation towards a point in the detector surface, so that the position for the concentrated radiation energy also determines the angle of incidence for the radiation towards the plane of the detector surface.

3. Laser warning device according to claim 1, wherein a sector of the dome is completely transparent to the radiation in question and another sector, opposite the first, is completely reflective to said radiation.

4. Laser warning device according to claim 1, wherein the dome is coated with a coating, that is partially reflective to the radiation in question, so that one part of the radiation that falls on the laser warning device passes from outside in through the dome and, after having passed across the warning device, is reflected by the inner side of the dome towards the detector surface.

5. Laser warning device according to claim 1, wherein the dome is provided with an impervious screen in the form of a ring at its base, near the plane of the detector surface.

6. Laser warning device according to claim 1, wherein the detector surface has a central hole, near which a cylindrical tap of adapted height is located as a screen.

7. Laser warning device according to claim 1, wherein it comprises a filter that blocks the radiation outside a certain wavelength interval, and that it is intended to be mounted together with, for instance stacked on, other similar laser warning devices that are, in the same way, sensitive to other wavelength intervals.

* * * * *